United States Patent [19]

Hefner, Jr. et al.

[11] 4,424,310

[45] Jan. 3, 1984

[54] POLY(ALLYL)POLY(ALKENYLPHENOLS)

[75] Inventors: Robert E. Hefner, Jr.; Garnet E. McConchie, both of Lake Jackson, Tex.

[73] Assignee: The Dow Chemical Company, Midland, Mich.

[21] Appl. No.: 437,100

[22] Filed: Oct. 28, 1982

[51] Int. Cl.$^3$ ............................................. C08F 12/24
[52] U.S. Cl. ..................................... 526/277; 526/313
[58] Field of Search ........................ 526/313; 568/722; 525/277

[56] References Cited

U.S. PATENT DOCUMENTS

| | | | |
|---|---|---|---|
| 4,018,725 | 4/1977 | Hadley | 525/502 |
| 4,173,592 | 11/1979 | Suzuki et al. | 525/134 |
| 4,217,433 | 8/1980 | Dyball | 525/277 |

FOREIGN PATENT DOCUMENTS

| | | | |
|---|---|---|---|
| 2818091 | 11/1978 | Fed. Rep. of Germany | 528/152 |
| 51-25543 | 2/1976 | Japan | 526/313 |
| 691041 | 5/1953 | United Kingdom | |

OTHER PUBLICATIONS

Chem. Abstract, vol. 97, Entry 31277c.
"Study of Copolymerization of p-Isopropenylphenol Allylether with Styrene", S. M. Aliyen, M. R. Bairamov, & M. D. Ibrahimova, *Polymer Science USSR*, vol. 21, pp. 1503-1507, Jun. 13, 1978.

*Primary Examiner*—Joseph L. Schofer
*Assistant Examiner*—Peter F. Kulkosky
*Attorney, Agent, or Firm*—J. G. Carter

[57] ABSTRACT

Poly(allyl)poly(alkenylphenols) are prepared by the transcarbonation of poly(alkenylphenols).

36 Claims, No Drawings

POLY(ALLYL)POLY(ALKENYLPHENOLS)

BACKGROUND OF THE INVENTION

The present invention pertains to novel polymeric monomers useful in the preparation of polymers. These polymeric monomers are the result of the transcarbonation of poly(alkenylphenols).

Poly(alkenylphenols) have been employed as curing agents for epoxy resins. The applicants herein have discovered that the allyl derivatives of these polymers are polymerizable to provide crosslinked homopolymers or halogenated to provide halogenated polymers.

SUMMARY OF THE INVENTION

The present invention is directed to new compositions of matter represented by the formulas

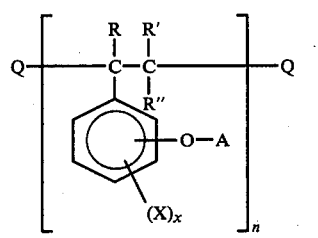

I.

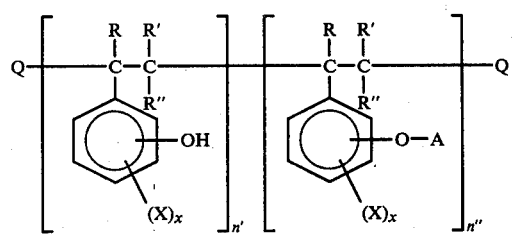

II.

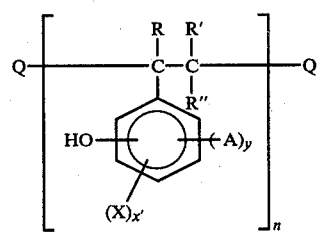

III.

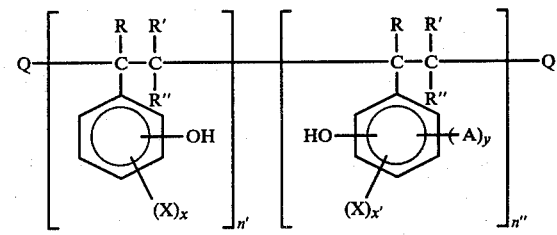

IV.

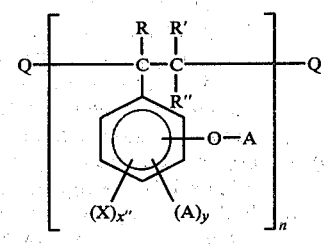

V.

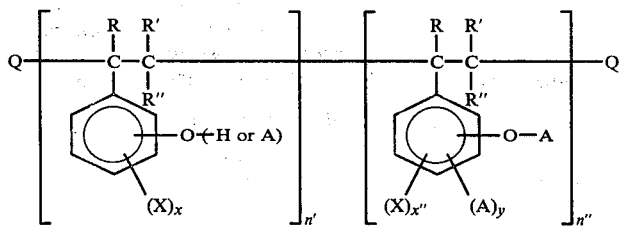

VI.

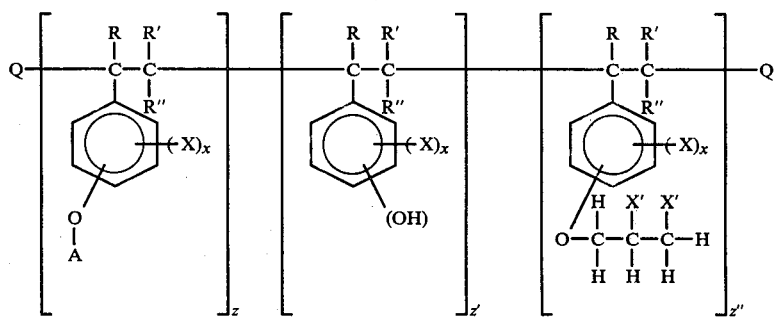

VII.

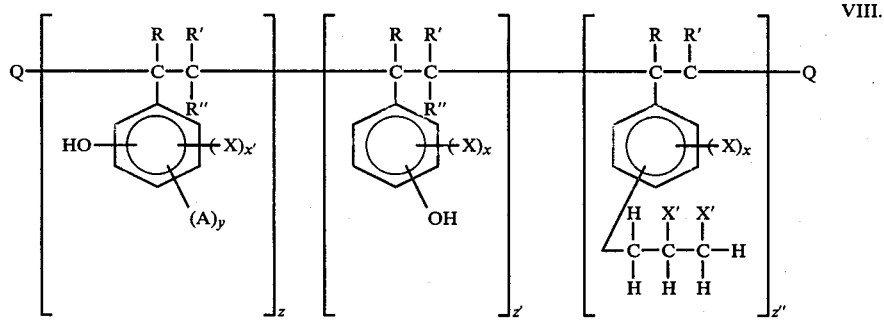

VIII.

wherein each A is a group represented by the formula —CH$_2$—CH=CH$_2$ (allyl); each R, R' and R" is independently hydrogen or an alkyl group having from 1 to about 3 carbon atoms; each X is independently an alkyl group having from 1 to about 4 carbon atoms, chlorine or bromine; each X' is independently chlorine or bromine; Q is independently a group derived from any suitable polymerization initiator or terminator, —H,

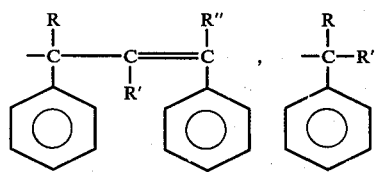

and wherein each aromatic ring may contain any substituent group as those enumerated as substituent groups in Formulas I through VIII; n has a value from about 5 to about 100, preferably from about 15 to about 80; n' has a value of from about 1 to about 99, preferably from about 1 to about 30; n" has a value of from about 1 to about 99, preferably from about 30 to about 99; x has a value from zero to 4; x' has a value of from zero to 3; x" has a value of zero to 2; y has a value of 1 or 2; z has a value from 0 to about 100; z' has a value of from 0 to about 100 and z" has a value from about 1 to about 100 and wherein the pbw of the individual components is based upon total composition.

DETAILED DESCRIPTION OF THE INVENTION

The polymers of the the present invention represented by formulas I and II wherein A is allyl can be prepared by the transcarbonation process wherein allylmethyl carbonate or a crude mixture containing allylmethyl carbonate is reacted with the poly(alkenylphenol) in the presence of a catalytic amount of palladium on carbon and triphenylphosphine. Although less preferred, the polymers of Formula II wherein A is allyl can be prepared by the direct allylation of a poly(alkenylphenol) with an allyl halide such as allyl chloride in the presence of an alkaline agent such as an aqueous solution of alkali metal hydroxide. Reaction temperatures of from about 25° to about 150° C. are operable with temperatures of 50° to 100° C. being preferred. If desired, inert solvents such as 1,4-dioxane and phase transfer catalysts such as benzyltrialkylammonium halides or tetraalkylammonium halides can be employed.

The average molecular weights of allylated derivatives of the poly(alkenylphenols) vary as a function of the average molecular weight of the respective poly(alkenylphenol) precursor as well as the extent of allylation. The extent of allylation may be varied such that each phenolic nucleus within the polymer chains is converted to an allylether group (Formula I wherein A is an allyl group) or only a portion of said phenolic hydroxyl groups are converted to allylether groups (Formula II wherein A is an allyl group).

The polymers represented by Formulas III and IV wherein A is an allyl group can be prepared by a thermally induced Claisen rearrangement of the polymers of Formulas I and II, respectively, wherein about all of the allylether groups are rearranged to form a hydroxyl group with one allyl group attached to the ring in an ortho position relative to the hydroxyl group. The reaction time or reaction temperature of the Claisen rearrangement can be decreased together or independently to convert only a part of the allylether groups of the polymers represented by Formulas I and II to allyl groups on the aromatic rings. Reaction time in excess of that required to induce rearrangement can cause partial homopolymerization of the allyl groups especially in polymers of the type represented by Formula I with average molecular weights over about 1000.

The term partial homopolymer as used herein means that not all of the allyl groups have been polymerized.

The polymers represented by Formulas V and VI wherein A is an allyl group can be prepared by allylation, preferably via the transcarbonation process, of the polymers of Formulas III and IV, respectively. If so desired, only a part of the aromatic hydroxyl groups of the polymers represented by Formulas III and IV can be converted to allylether groups by using less than stoichiometric amounts of allylmethyl carbonate. The polymers represented by Formulas V and VI are complex isomeric mixtures of polyallylpoly(alkenylphenols).

The polymers represented by Formulas VII and VIII can be prepared by halogenation of the polymers of Formula I or II and Formula III or IV, respectively. The halogenation is carried out in a solvent suitable for the allylated poly(alkenylphenol) of Formulas I, II, III, or IV. One useful solvent is methylene chloride. The solution is maintained at minus 20° C. to 50° C. and preferably 0° to 25° C. The solution is sparged with nitrogen, the halogen, preferably bromine, is added dropwise with stirring while maintaining reaction temperature. Less than stoichiometric amounts of halogen can be used to control the amount of halogen as well as the amount of unreacted allyl groups in the product. It is frequently desireable to maintain the reaction mixture for a period of at least about one-half hour after halogen addition is complete. It may be of advantage to add an oxirane compound, such as an epoxide or polyepoxide, as a hydrohalide scavenger to aid in stabilization of the product. Removal of the solvent, for example, using distillation under reduced pressure, provides the final product.

In those instances where X is a halogen or an alkyl group, such products can be prepared by halogenating or alkylating the aromatic ring of the poly(alkenylphenol) prior to use in an allylation reaction.

Useful products are prepared wherein all or a part of the allyl groups are halogenated, and wherein all, a part, or none of the aromatic rings simultaneously bear halogen groups. If all of the allyl groups are completely halogenated, these halogenated products become useful as a non-reactive (no polymerizable allyl groups) additive for fire retardant polymers.

The poly(alkenylphenols) which are the starting materials for the products of the present invention can be purchased commercially from Maruzen Oil Co., Ltd., Tokyo, Japan as p-vinylphenol polymer Resin M or Resin MB.

If desired, the starting materials can be prepared by polymerizing an alkenylphenol or mixture of alkenylphenols by any suitable means such as heating in the presence or absence of a catalyst at a temperature of from about 25° C. to about 150° C. p-Vinylphenol readily homopolymerizes on standing at room temperature (25° C.).

The following examples are illustrative of the present invention, but are not to be construed as to limiting the scope thereof in any manner.

EXAMPLE 1

A transcarbonation reaction was used to prepare the poly(allylether) of poly(para-vinylphenol), as follows:

Allyl alcohol (128.6 grams, 2.22 moles), dimethyl carbonate (199.6 grams, 2.22 moles), and sodium methoxide catalyst (0.30 gram) were added to a reactor and maintained at room temperature (25° C.) with stirring under a nitrogen atmosphere. An equilibrium mixture of allylmethyl carbonate, diallyl carbonate, and methanol was rapidly formed. After thirty minutes (1800 s), poly(-para-vinylphenol) (26.77 grams, 0.00765 mole), triphenylphosphine (0.06 gram), and 5.0% palladium on carbon (0.24 gram) were added to the reactor and heating was started. The poly(para-vinylphenol) used was a commercial grade product with a 3500 average molecular weight and was dried before use. The reaction mixture was maintained for four hours (14400 s) at 82° C. and then cooled to 40° C. Filtration through Celite, followed by vacuum stripping at 100° C. and 10 mm provided a light amber-colored, tacky solid (34.2 grams, 95.2% yield). Nuclear magnetic resonance spectroscopy confirmed the product as the poly(allylether) of poly(para-vinylphenol), wherein 100% of the phenolic hydroxyl groups were converted to allylether groups.

EXAMPLE 2

A transcarbonation reaction was used to prepare the poly(allylether) of brominated poly(paravinylphenol), as follows:

Allyl alcohol (144.2 grams, 2.48 moles), dimethyl carbonate (223.6 grams, 2.48 moles), and sodium methoxide catalyst (0.33 gram) were added to a reactor and maintained at room temperature (25° C.) with stirring under a nitrogen atmosphere. An equilibrium mixture of allylmethyl carbonate, diallyl carbonate, and methanol was rapidly formed. After thirty minutes (1800 s), brominated poly(para-vinylphenol) (50.0 grams, 0.0050 mole), triphenylphosphine (0.06 gram), and 5.0% palladium on carbon (0.25 gram) were added to the reactor and heating was started. The brominated poly(para-vinylphenol) used as a commercial grade product with a 10,000 average molecular weight and containing an average of 1.03 bromine atoms per para-vinylphenol unit. The reaction mixture was maintained for six hours (21600 s) at 82° C. and then cooled to 25° C. Filtration through Celite, followed by vacuum stripping at 100° C. and 10 mm provided a light tan-colored solid (58.5 grams, 99.2% yield). Nuclear magnetic resonance spectroscopy confirmed the product as the poly(allylether) of brominated poly(para-vinylphenol), wherein 88% of the phenolic hydroxyl groups were converted to allylether groups.

EXAMPLE 3

A portion of the poly(allylether) of poly(para-vinylphenol) of Example 1 was thermally homopolymerized and simultaneously examined by differential scanning calorimetry (DSC). Under an inert nitrogen atmosphere, a 6.20 mg sample was heated at a rate of 10.0 deg/min. and the cure rate was analyzed. The cured poly(allylether) of poly(para-vinylphenol) (homopolymer) thus obtained was cooled to room temperature (25° C.) and again heated until endothermic decomposition occurred. The results are reported in the following Table.

| Temperature (°C.) | Hours to a 50% Cure |
|---|---|
| 160 | 188.9 |
| 170 | 55.8 |
| 180 | 17.4 |
| 190 | 5.7 |
| 200 | 1.16 |
| 210 | 0.70 |
| 220 | 0.26 |

Energy of activation = 167.18 ± 3.61 KJ/mole
Kinetic order = 1.01 ± 0.02

EXAMPLE 4

The transcarbonation reaction of Example 1 was repeated to provide the poly(allylether) of poly(para-vinylphenol). The poly(allylether) of poly(para-vinylphenol) was added to a reactor, maintained under a nitrogen atmosphere, and heating was started. Once the poly(allylether) had melted to a liquid, stirring was started. After 60 minutes at a 190° C. reaction temperature, a sample was removed from the reactor. After an additional 45 minutes, a solid, brittle, partial homopolymer had formed. This partial homopolymer was insoluble in hot acetone, chloroform, or dimethylsulfoxide. The sample was analyzed by nuclear magnetic resonance spectroscopy and the following results were obtained:

| Reaction time at 190° C. | Allylether groups (%) | Aromatic ring allyl groups (%) | Percent of allylated alkenyl-phenol units in the polymer chains |
|---|---|---|---|
| 0 | 100 | none | 100 |
| 60 | 47.3 | 32.7 | 80[1] |

[1]20% allyl groups have homopolymerized.

EXAMPLE 5

A transcarbonation reaction was used to prepare the partial poly(allylether) of poly(para-vinylphenol), as follows:

Allyl alcohol (128.6 grams, 2.22 moles), dimethyl carbonate (199.6 grams, 2.22 moles), and sodium methoxide catalyst (0.30 gram) were added to a reactor and maintained at room temperature (25° C.) with stirring. An equilibrium mixture of allylmethyl carbonate, diallyl carbonate, and methanol was rapidly formed. After fifteen minutes, poly(para-vinylphenol) (57.62 grams, 0.03034 mole), triphenylphosphine (0.06 gram), and 5.0% palladium on carbon (0.24 gram) were added to the reactor maintained under a nitrogen atmosphere and heating was started. The poly(para-vinylphenol) used was a commercial grade product with a 1800 average molecular weight and was dried before use. The reaction mixture was maintained for six hours (21600 s) at 75° C. and then cooled to room temperature (25° C.). Filtration through Celite, followed by vacuum stripping at 100° C. and 10 mm provided a amber-colored solid (62.0 grams, 98.3% yield). Nuclear magnetic resonance spectroscopy confirmed the product as the partial poly(allylether) of poly(para-vinylphenol), wherein 46.6% of the phenolic hydroxyl groups were converted to allylether groups.

The partial poly(allylether) of poly(para-vinylphenol) was added to a reactor, maintained under a nitrogen atmosphere, and heating was started. Once the partial poly(allylether) had melted to a liquid, stirring was started. After 45 minutes at a 200° C. reaction temperature, a sample was removed from the reactor. After an additional 15 minutes of reaction at the 200° C. temperature, the reactor was cooled and a second sample of the solid amber-colored product was obtained. Both samples were analyzed by nuclear magnetic resonance spectroscopy and the following results were obtained:

| Reaction time at 200° C. | Allylether groups (%) | Aromatic ring allyl groups (%) | Percent of allylated alkenyl-phenol units in the polymer chains |
|---|---|---|---|
| 0 | 46.6 | none | 46.6 |
| 45 | 4.85 | 41.75 | 46.6 |
| 60 | 2.1 | 42.7 | 44.8[1] |

[1]1.8% allyl groups had homopolymerized.

EXAMPLE 6

A portion of the poly(allylether) prepared in Example 1 was converted to a partially brominated product wherein the bromine was added to a portion of the allyl groups, as follows:

A portion of the poly(allylether) of para-vinylphenol polymer from Example 1 (1.056 grams, 0.000226 mole) was added to a reactor maintained under a nitrogen atmosphere. Methylene chloride (25 milliliters) was added to the reactor and stirring was started. Bromine (0.53 grams, 0.0033 mole) was added to the stirred, room temperature (25° C.) solution. Thirty minutes later, the methylene chloride solvent was removed under vacuum to provide the partially brominated poly(allylether) of para-vinylphenol polymer (1.44 grams). Nuclear magnetic resonance spectroscopy confirmed the product as the partially bromiated poly(allylether) of para-vinylphenol polymer, wherein 46% of the allylether groups had been converted to dibromopropane ether groups.

We claim:

1. A new composition of matter represented by Formulas I, II, III, IV, V, VI, VII, or VIII as shown in the specification wherein each A is a group represented by the formula $-CH_2-CH=CH_2$; each R, R' and R'' is independently hydrogen or an alkyl group having from 1 to about 3 carbon atoms; each X is independently an alkyl group having from 1 to about 4 carbon atoms, chlorine or bromine with the proviso that at least one X on each ring is chlorine or bromine; each X' is independently chlorine or bromine; Q is independently a group derived from any suitable polymerization initiator or terminator, $-H$,

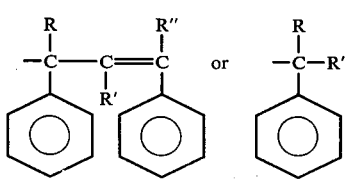

and wherein each aromatic ring may contain any substituent group as those enumerated as substituent groups in Formulas I through VIII; n has a value from about 5 to about 100; n' has a value of from about 1 to about 99; n'' has a value of from about 1 to about 99; x has a value from zero to 4; x' has a value of from zero to 3; x'' has a value of zero to 2; y has a value of 1 or 2; z has a value from 0 to about 100; z' has a value of from 0 to about 100 and z'' has a value from about 1 to about 100.

2. A composition of claim 1 represented by Formula I wherein each A is a group represented by $-CH_2-CH=CH_2$; each R, R' and R'' is independently hydrogen or an alkyl group having from 1 to about 3 carbon atoms; each X is independently an alkyl group having from 1 to about 4 carbon atoms, chlorine or bromine; n has a value of from about 5 to about 100 and x has a value of from zero to 4.

3. A composition of claim 2 wherein each R, R' and R'' is independently hydrogen or a methyl group and x has a value of zero.

4. A composition of claim 2 wherein each R, R' and R'' is independently hydrogen or a methyl group; X is bromine and x has a value from 1 to 2.

5. A composition of claim 1 represented by Formula II wherein each A is a group represented by the formula $-CH_2-CH=CH_2$; each R, R' and R'' is independently hydrogen or an alkyl group having from 1 to about 3 carbon atoms; each X is independently an alkyl group, chlorine or bromine; n' has a value of from about 1 to about 99; n'' has a value of from about 1 to about 99 and x has a value from zero to 4.

6. A composition of claim 5 wherein each R, R' and R'' is independently hydrogen or a methyl group and x has a value of zero.

7. A composition of claim 5 wherein each R, R' and R'' is independently hydrogen or a methyl group; X is bromine and x has a value of from 1 to 2.

8. A composition of claim 1 represented by Formula III wherein each A is a group represented by the formula $-CH_2-CH=CH_2$; each R, R' and R'' is independently hydrogen or an alkyl group having from 1 to about 3 carbon atoms; each X is independently an alkyl group having from 1 to about 4 carbon atoms, chlorine or bromine; n has a value of from about 5 to about 100; x' has a value of from zero to 3 and y has a value of 1 or 2.

9. A composition of claim 8 wherein each R, R' and R'' is independently hydrogen or a methyl group and x' has a value of zero.

10. A composition of claim 8 wherein each R, R' and R'' is independently hydrogen or a methyl group; X is bromine and x' has a value of from 1 to 2.

11. A composition of claim 1 represented by Formula IV wherein each A is a group represented by the formula $-CH_2-CH=CH_2$; each R, R' and R'' is independently hydrogen or an alkyl group having from 1 to about 4 carbon atoms, chlorine or bromine; n' has a value of from about 1 to about 99; n'' has a value of from about 1 to about 99; x has a value of from zero to 4; x' has a value of from zero to 3 and y has a value of 1 or 2.

12. A composition of claim 11 wherein each R, R' and R'' is independently hydrogen or a methyl group; x has a value of zero and x'0 has a value of zero.

13. A composition of claim 11 wherein each R, R' and R'' is independently hydrogen or a methyl group; X is bromine; x has a value from 1 to 2 and x' has a value from 1 to 2.

14. A composition of claim 1 represented by Formula VII wherein each A is a group represented by the formula $-CH_2-CH=C_2$; each R, R' and R'' is independently hydrogen or an alkyl group having from 1 to about 3 carbon atoms; each X is independently an alkyl group having from 1 to about 4 carbon atoms, chlorine or bromine; each X' is independently chlorine or bromine; x has a value of from zero to 4; z' has a value of from zero to about 100 and z'' has a value of from about 1 to about 100.

15. A composition of claim 14 wherein each R, R' and R'' is independently hydrogen or a methyl group and x has a value of zero.

16. A composition of claim 14 wherein each R, R' and R'' is independently hydrogen or a methyl group; x has a value of zero and z has a value of zero.

17. A composition of claim 14 wherein each R, R' and R'' is independently hydrogen or a methyl group; x has a value of zero and z' has a value of zero.

18. A composition of claim 14 wherein each R, R' and R'' is independently hydrogen or a methyl group; x has a value of zero; z has a value of zero and z' has a value of zero.

19. A composition of matter of claim 14 wherein each R, R' and R'' is independently hydrogen or a methyl group; X is bromine; X' is bromine; x has a value of from 1 to 2 and z has a value of zero.

20. A composition of claim 14 wherein each R, R' and R'' is independently hydrogen or a methyl group; X is bromine; X' is bromine; x has a value from 1 to 2 and z' has a value of zero.

21. A composition of matter of claim 14 wherein each R, R' and R'' is independently hydrogen or a methyl group; X is bromine, X' is bromine; x has a value from 1 to 2; z has a value of zero and z' has a value of zero.

22. A composition of claim 1 represented by Formula VIII wherein each A is a group represented by the formula $-CH_2-CH=CH_2$; each R, R' and R'' is independently hydrogen or an alkyl group having from 1 to about 3 carbon atoms; each X is independently an alkyl group having from 1 to about 4 carbon atoms, chlorine or bromine; x has a value from zero to 3; y has a value of 1 or 2; z has a value from zero to about 100; z' has a value from about 0 to about 100 and z'' has a value from about 1 to about 100.

23. A composition of claim 22 wherein each R, R' and R'' is independently hydrogen or a methyl group; x has a value of zero and x' has a value of zero.

24. A composition of claim 22 wherein each R, R' and R'' is independently hydrogen or a methyl group; x has a value of zero and z has a value of zero.

25. A composition of claim 22 wherein each R, R' and R'' is independently hydrogen or a methyl group; x has a value of zero; x' has a value of zero and z' has a value of zero.

26. A composition of claim 22 wherein each R, R' and R'' is independently hydrogen or a methyl group; x has a value of zero; z has a value of zero and z' has a value of zero.

27. A composition of claim 22 wherein each R, R' and R'' is independently hydrogen or a methyl group; X is bromine; X' is bromine; x has a value from 1 to 2 and z has a value of zero.

28. A composition of claim 22 wherein each R, R' and R'' is independently hydrogen or a methyl group; X is bromine; X' is bromine; x has a value of from 1 to 2; x' has a value of from 1 to 2 and z' has a value of zero.

29. A composition of claim 22 wherein each R, R' and R" is hydrogen or a methyl group; X is bromine; X' is bromine; x has a value from 1 to 2; z has a value of zero and z' has a value of zero.

30. A homopolymer or partial homopolymer of a monomer represented by Formulas I, II, III, IV, V, VI, VII, or VIII as shown in the specification wherein each A is a group represented by the formula $-CH_2-CH=CH_2$; each R, R' and R" is independently hydrogen or an alkyl group having from 1 to about 3 carbon atoms; each X is independently an alkyl group having from 1 to about 4 carbon atoms, chlorine or bromine; each X' is independently chlorine or bromine with the proviso that at least one X on each ring is chlorine or bromine; Q is independently a group derived from any suitable polymerization initiator or terminator, $-H$,

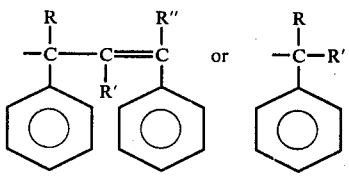

and wherein each aromatic ring may contain any substituent group as those enumerated as substituent groups in Formulas I through VIII; n has a value from about 5 to about 100; n' has a value of from about 1 to about 99; n" has a value of from about 1 to about 99; x has a value from zero to 4; x' has a value of from zero to 3; x" has a value of zero to 2; y has a value of 1 or 2; z has a value from 0 to about 100; z' has a value of from 0 to about 100 and z" has a value from about 1 to about 100.

31. A homopolymer or partial homopolymer of claim 30 represented by Formula I wherein each A is a group represented by $-CH_2-CH=CH_2$; each R, R' and R" is independently hydrogen or an alkyl group having from 1 to about 3 carbon atoms; each X is independently an alkyl group having from 1 to about 4 carbon atoms, chlorine or bromine; n has a value of from about 5 to about 100 and x has a value of from zero to 4.

32. A homopolymer or partial homopolymer of claim 30 represented by Formula II wherein each A is a group represented by the formula $-CH_2-CH=CH_2$; each R, R' and R" is independently hydrogen or an alkyl group having from 1 to about 3 carbon atoms; each X is independently an alkyl group, chlorine or bromine; n' has a value of from about 1 to about 99; n" has a value of from about 1 to about 99 and x has a value from zero to 4.

33. A homopolymer or partial homopolymer of claim 30 represented by Formula III wherein each A is a group represented by the formula $-CH_2-CH=CH_2$; each R, R' and R" is independently hydrogen or an alkyl group having from 1 to about 3 carbon atoms; each X is independently an alkyl group having from 1 to about 4 carbon atoms, chlorine or bromine; n has a value of from about 5 to about 100; x' has a value of from zero to 3 and y has a value of 1 or 2.

34. A homopolymer or partial homopolymer of claim 30 represented by Formula IV wherein each A is a group represented by the formula $-CH_2-CH=CH_2$; each R, R' and R" is independently hydrogen or an alkyl group having from 1 to about 4 carbon atoms, chlorine or bromine; n' has a value of from about 1 to about 99; n" has a value of from about 1 to about 99; x has a value of from zero to 4; x' has a value of from zero to 3 and y has a value of 1 or 2.

35. A homopolymer or partial homopolymer of claim 30 represented by Formula VII wherein each A is a group represented by the formula $-CH_2-CH=CH_2$; each R, R' and R" is independently hydrogen or an alkyl group having from 1 to about 3 carbon atoms; each X is independently an alkyl having from 1 to about 4 carbon atoms, chlorine or bromine; each X' is independently chlorine or bromine; x has a value of from zero to 4; z' has a value of from zero to about 100 and z" has a value of from about 1 to about 100.

36. A homopolymer or partial homopolymer of claim 30 represented by Formula VIII wherein each A is a group represented by the formula $-CH_2-CH=CH_2$; each R, R' and R" is independently hydrogen or an alkyl group having from 1 to about 3 carbon atoms; each X is independently an alkyl group having from 1 to about 4 carbon atoms, chlorine or bromine; x has a value from zero to 3; y has a value of 1 or 2; z has a value from zero to about 100; z' has a value from about 0 to about 100 and z" has a value from about 1 to about 100.

* * * * *

UNITED STATES PATENT AND TRADEMARK OFFICE
CERTIFICATE OF CORRECTION

PATENT NO. : 4,424,310
DATED : January 3, 1984
INVENTOR(S) : Robert E. Hefner, Jr. and Garnet E. McConchie It is certified that error appears in the above—identified patent and that said Letters Patent is hereby corrected as shown below:

Cols. 3 & 4, Formula VII should read as follows:

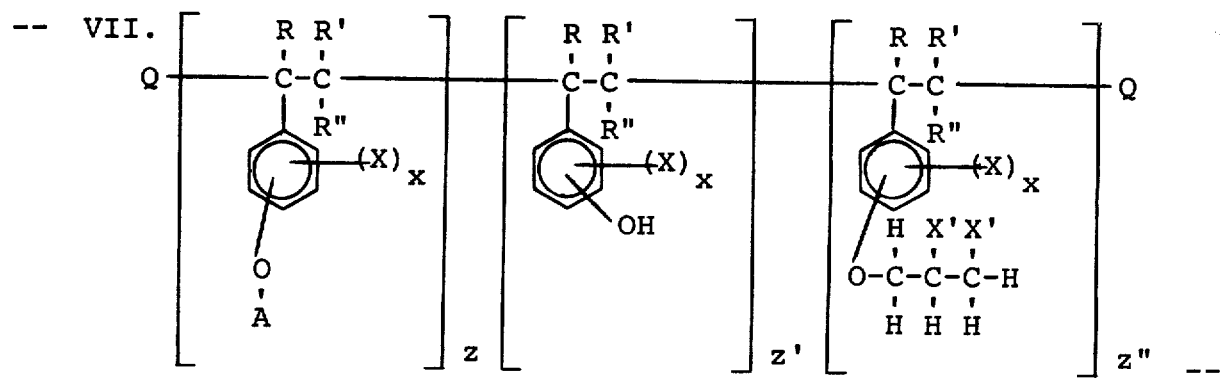

Col. 4, line 42; delete the second occurrence of "the".

Col. 6, line 50; "as" should be --was--.

UNITED STATES PATENT AND TRADEMARK OFFICE
CERTIFICATE OF CORRECTION

PATENT NO. : 4,424,310  PAGE 2 of 2
DATED : January 3, 1984
INVENTOR(S) : Robert E. Hefner, Jr. and Garnet E. McConchie It is certified that error appears in the above—identified patent and that said Letters Patent is hereby corrected as shown below:

Col. 8, line 42; "bromiated" should be --brominated--.

Col. 9, line 64; change "x'O" to --x'--.

Col. 10, line 34; "," should be --;--.

Col. 12, line 29, insert --group-- between "alkyl" and "having".

Signed and Sealed this

Fourteenth Day of August 1984

[SEAL]

Attest:

GERALD J. MOSSINGHOFF

Attesting Officer

Commissioner of Patents and Trademarks